(12) United States Patent
Musil et al.

(10) Patent No.: US 11,633,800 B2
(45) Date of Patent: Apr. 25, 2023

(54) METHOD FOR CONTACTLESSLY STRIKING AN ARC AND WELDING CURRENT SOURCE FOR CARRYING OUT A STRIKING PROCESS

(71) Applicant: Fronius International GmbH, Pettenbach (AT)

(72) Inventors: Franz Peter Musil, Pettenbach (AT); Andreas Prinz, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 515 days.

(21) Appl. No.: 16/651,514

(22) PCT Filed: Nov. 6, 2018

(86) PCT No.: PCT/EP2018/080223
§ 371 (c)(1),
(2) Date: Mar. 27, 2020

(87) PCT Pub. No.: WO2019/091934
PCT Pub. Date: May 16, 2019

(65) Prior Publication Data
US 2020/0261996 A1   Aug. 20, 2020

(30) Foreign Application Priority Data

Nov. 8, 2017 (EP) ..................... 17200599

(51) Int. Cl.
*B23K 9/067* (2006.01)
*B23K 9/09* (2006.01)
(52) U.S. Cl.
CPC ............ *B23K 9/0673* (2013.01); *B23K 9/092* (2013.01)
(58) Field of Classification Search
CPC ............................. B23K 9/0673; B23K 9/092
See application file for complete search history.

(56) References Cited

U.S. PATENT DOCUMENTS 3,548,145 A   12/1970   Binder et al.
3,876,855 A    4/1975   Hirasawa et al.
(Continued)

FOREIGN PATENT DOCUMENTS

CN   1040301 C   10/1998
CN   1404428 A    3/2003
(Continued)

OTHER PUBLICATIONS

Chinese Office Action in CN 201880068448.3, dated Apr. 26, 2021.
(Continued)

*Primary Examiner* — Erin E McGrath
(74) *Attorney, Agent, or Firm* — Collard & Roe, P.C.

(57) ABSTRACT

The invention relates to a method for contactless ignition an arc (L) between an electrode (3) and a workpiece (4) which is to be welded, for carrying out a welding process, wherein a welding current (I) and a welding voltage (U) are provided at an output (2) of a welding current source (1), wherein the welding current source (1) contains a resonance converter (5) for generating a periodically varying, preferably substantially sawtooth-shaped, open circuit welding voltage ($U_{LL}$) with voltage maxima ($U_{LL,max}$) which recur periodically with a repetition rate ($f_w$) and a welding current source (1) for carrying out the igniting process. In order to achieve reliable contactless ignition of the arc (L) without complicated circuitry, the resonance converter (5) is formed by a series-parallel resonant converter, and temporally synchronous high-frequency pulses ($U_{LHF}$) are superimposed on the open circuit welding voltage ($U_{LL}$) in the region of at least some of the periodically recurring voltage maxima ($U_{LL,max}$) of the open circuit welding voltage ($U_{LL}$).

18 Claims, 4 Drawing Sheets

(56) References Cited

U.S. PATENT DOCUMENTS

| | | | |
|---|---|---|---|
| 4,061,899 A | 12/1977 | Gillitzer et al. | |
| 5,117,088 A | 5/1992 | Stava | |
| 5,352,861 A | 10/1994 | Steigerwald et al. | |
| 5,582,751 A | 12/1996 | Hagiwara et al. | |
| 6,849,828 B2 | 2/2005 | Aigner | |
| 7,638,734 B2 | 12/2009 | Prinz et al. | |
| 8,389,898 B2 | 3/2013 | Aigner | |
| 9,114,471 B2 | 8/2015 | Koprivnak et al. | |
| 2005/0189334 A1* | 9/2005 | Stava | B23K 9/092 219/130.51 |
| 2007/0102405 A1* | 5/2007 | Prinz | B23K 9/093 219/130.4 |
| 2012/0223058 A1 | 9/2012 | Nishikawa et al. | |
| 2013/0293008 A1 | 11/2013 | Quigley | |
| 2014/0251968 A1 | 9/2014 | Peters | |
| 2016/0332247 A1* | 11/2016 | Mori | B23K 9/173 |

FOREIGN PATENT DOCUMENTS

| | | |
|---|---|---|
| CN | 1886225 A | 12/2006 |
| CN | 101791734 A | 8/2010 |
| CN | 102161125 A | 8/2011 |
| CN | 102596478 A | 7/2012 |
| CN | 104661783 A | 5/2015 |
| CN | 106216810 A | 12/2016 |
| CN | 106900135 A | 6/2017 |
| CN | 206305585 A | 7/2017 |
| DE | 1615363 A1 | 5/1970 |
| DE | 23 07 753 A1 | 8/1973 |
| DE | 2449557 B1 | 3/1976 |
| EP | 2 216 124 A1 | 8/2010 |
| JP | S47-028306 B | 7/1972 |
| JP | S50-074546 A | 6/1975 |
| JP | H03-234365 A | 10/1991 |
| WO | 97/01211 A1 | 1/1997 |
| WO | 2005/051585 A1 | 6/2005 |
| WO | 2006/131162 A1 | 12/2006 |
| WO | 2016/142218 A1 | 9/2016 |

OTHER PUBLICATIONS

International Search Report of PCT/EP2018/080223, dated Feb. 25, 2019.
Japanese Office Action in JP 2020-517508, dated Mar. 30, 2021, with English translation.
English translation of International Preliminary Report on Patentability in PCT/EP2018/080223 dated May 14, 2020.

\* cited by examiner

METHOD FOR CONTACTLESSLY STRIKING AN ARC AND WELDING CURRENT SOURCE FOR CARRYING OUT A STRIKING PROCESS

CROSS REFERENCE TO RELATED APPLICATIONS

This application is the National Stage of PCT/EP2018/080223 filed on Nov. 6, 2018, which claims priority under 35 U.S.C. § 119 of European Application No. 17200599.3, filed on Nov. 8, 2017, the disclosure of which is incorporated by reference. The international application under PCT article 21(2) was not published in English.

The invention relates to a method for contactless ignition of an arc between an electrode and a workpiece to be welded, for carrying out a welding process, wherein a welding current and welding voltage are provided at an output of a welding current source, wherein the welding current source contains a resonance converter for generating a periodically varying, preferably substantially saw-tooth-shaped open circuit welding voltage with voltage maxima, which recur periodically at a repetition rate.

The invention further relates to a welding current source for providing a welding current and a welding voltage at an output for carrying out a welding process with an arc between an electrode and a workpiece to be welded, having a resonance converter for generating a periodically varying, preferably substantially saw-tooth-shaped open circuit welding voltage with voltage maxima, which recur periodically at a repetition rate.

The present invention relates to an igniting process and a welding current source for carrying out an igniting process for welding technology, which may involve both welding with a melting electrode, such as MIG (Metal Inert Gas)—or MAG (Metal Active Gas) welding processes, as well as welding processes with non-melting electrodes, such as TIG (Tungsten Inert Gas) welding.

For contactless igniting the arc necessary for the welding process between the electrode and the workpiece to be welded, a high voltage is beneficial. For reasons of safety, however, the maximum permissible continuous open circuit welding voltage at the output of a welding current source is usually limited by standards.

It is therefore encouraged to design the welding current sources so that, on the one hand, the safety regulations are satisfied and on the other hand, to ensure a safe ignition of the arc. Different methods are available for this purpose, some of which incur significant circuit complexity, which can not only increase the cost of a welding current source, but also the assembled size, since the circuits used for improving the ignition behaviour can occupy a considerable portion of the welding current source.

For example, in welding current sources of the prior art auxiliary voltage sources are used in order to raise the output voltage and enable ignition of the arc.

Thus, for example, from WO 2005/051585 A1 or U.S. Pat. No. 5,117,088 A, for contactless ignition it is known to overlay high-frequency pulses on the welding voltage.

Document US 2014/0251968 A1 describes a welding system with a high-frequency ignition, wherein a control device is provided which activates the ignition depending on the intended welding process.

The present invention is directed towards a igniting process as mentioned above and a welding current source as mentioned above for carrying out a igniting process, in which to generate a periodically varying, preferably substantially sawtooth-shaped open circuit welding voltage a resonance converter contains voltage maxima which recur periodically at a repetition rate.

Resonance converters are electrical circuits based on resonance at a specific resonance frequency. Usually, pulses are applied with a frequency close to this resonant frequency, thereby exciting the resonant circuit at the resonant frequency, which results in a periodically varying output voltage. For example, document WO 2016/142218 A1 describes a resonance converter with appropriate capacitive and inductive components, which can also be applied in a current source for a welding device.

The object of the present invention is to create an above-mentioned method and an above-mentioned welding current source, which ensure a safe igniting process while incurring minimal cost, in order to allow its economic application even with the above-mentioned cost-effective welding current sources with resonance converters for generating a periodically varying open circuit voltage. Disadvantages of known methods are to be avoided or at least reduced.

According to the invention, the object is achieved with regard to the method by the fact that the resonance converter is formed by a series-parallel resonance converter, and that time-synchronized high-frequency pulses are superimposed on the open circuit welding voltage in the region of at least some periodically recurring voltage maxima of the open circuit welding voltage. The present method is thus designed to superimpose the high-frequency pulses in a time-synchronized manner with at least some voltage maxima of the periodically varying open circuit welding voltage, which enables the best possible ignition properties to be achieved. A resonance converter formed by a series-parallel resonance converter as part of the welding current source has a particularly simple and therefore inexpensive and compact design. Complicated circuits to increase the igniting voltage, such as voltage-doubler circuits or other auxiliary circuits, are not necessary, which is why the cost of implementing the method can be kept very low. Because the high-frequency pulses are superimposed time-synchronously on the voltage maxima of the open circuit welding voltage, the ignition properties can be improved, and at the same time, applicable safety regulations can be complied with. Because the high-frequency pulses do not necessarily have to be superimposed on every voltage maximum of the open circuit welding voltage, the mean continuously applied open circuit welding voltage can be kept below regulatory limits.

The statement that the high-frequency pulses are to be superimposed in the region of the voltage maximum is intended to express the fact that the high-frequency pulses do not need to be superimposed exactly at the time of the occurrence of the voltage maximum, but instead this can take place in a region before or after the occurrence of the voltage maximum. Experience has shown that a superimposition of the high-frequency pulses in the region of the voltage maximum, or 90% of the voltage maximum, is optimal and/or sufficient.

Advantageously, time-synchronous high-frequency pulses are superimposed on the open circuit welding voltage in the region of every nth voltage maximum of the open circuit welding voltage, where n is a positive whole number greater than or equal to 1. An appropriate choice of the value of n means that, on the one hand, the mean energy transmitted at the output of the welding current source can be limited to allow compliance with the safety regulations, and on the other hand, the method can allow for the fact that the generation of high-frequency pulses by charging up corresponding storage components, such as capacitors, requires a certain amount of time.

According to a further feature of the invention, the welding voltage is measured and the exceeding of a predefined voltage value is detected, and the high-frequency pulses are superimposed time-synchronously on at least some detected defined voltage values. By the additional measurement of the open circuit welding voltage, the temporal synchronization of the superposition of the high-frequency pulses with at least some voltage maxima can be improved, since the real conditions are taken into account. By setting the defined voltage value in the range of the expected voltage maxima, the time of occurrence of the voltage maxima can be detected very reliably and the high-frequency pulse can be superimposed on the voltage maximum in a temporally synchronous manner.

The high-frequency pulses can be superimposed by a specified period of time, preferably up to 5 ms, before or after the occurrence of the voltage maximum. As already mentioned above, the superposition of the high-frequency pulses is not performed exactly at the time of the voltage maximum, but can also take place in a region before or thereafter, without the ignition properties being substantially degraded. In conventional arc ignition process, delays in the range between 0 and 5 ms have proved to be suitable.

Advantageously, an open circuit welding voltage with a repetition frequency of between 10 Hz and 100 Hz, in particular 33 Hz, is provided. These frequency ranges represent appropriate values for welding current sources.

Ideally, high-frequency pulses are superimposed with a frequency between 100 kHz and 10 MHz. High-frequency pulses with such a frequency have an amplitude of several kV in order to ionize the igniting path sufficiently for the ignition.

The object according to the invention is also achieved by an above-mentioned welding current source, in which the resonance converter is formed by a series-parallel resonance converter, and a circuit for generating high-frequency pulses is provided, which circuit, in order to contactless ignite the arc, is designed to superimpose the high-frequency pulses time-synchronously onto the open circuit welding voltage in the region of at least some periodically recurring voltage maxima of the open circuit welding voltage. Such a welding current source is characterized by a relatively simple and cost-effectively producible construction and small size. For details of further advantages achievable as a result, reference is made to the above description of the method according to the invention.

Advantageously, the circuit for generating the high-frequency pulses is designed for superimposing the high-frequency pulses of the open circuit welding voltage time-synchronously in the region of every nth voltage maximum of the open circuit welding voltage, where n is a positive whole number greater than or equal to 1. As already mentioned above, it is not absolutely necessary to superimpose corresponding high-frequency pulses at each voltage maximum of the open circuit welding voltage in order to ensure a safe and suitable igniting of the arc.

According to a further feature of the invention, a measuring device for detecting the welding voltage is provided, which measuring device is connected to the circuit for generating the high-frequency pulses via a control device, so that the high-frequency pulses can be superimposed with the detected defined voltage values in a time-synchronous manner. The measuring device can be formed by a commonly available device for monitoring the welding voltage, so that no additional hardware is required.

Furthermore, the circuit for generating the high-frequency pulses can be designed to superimpose the high-frequency pulses temporally offset by a specified period of time, preferably up to 5 ms, before or after the occurrence of the voltage maximum.

Advantageously, the circuit for generating the periodically varying open circuit welding voltage is designed with a repetition frequency between 10 Hz and 100 Hz, in particular 33 Hz.

Ideally, the circuit for generating high-frequency pulses is designed between 100 kHz and 10 MHz.

The electrode can be formed by a non-melting electrode, in particular, a tungsten electrode. Particularly in the case of TIG welding processes with non-melting tungsten electrodes, the contactless ignition of the arc at low open circuit voltages presents a considerable challenge.

The present invention will be explained in further detail by reference to the attached drawings. Shown are.

Figure 1:
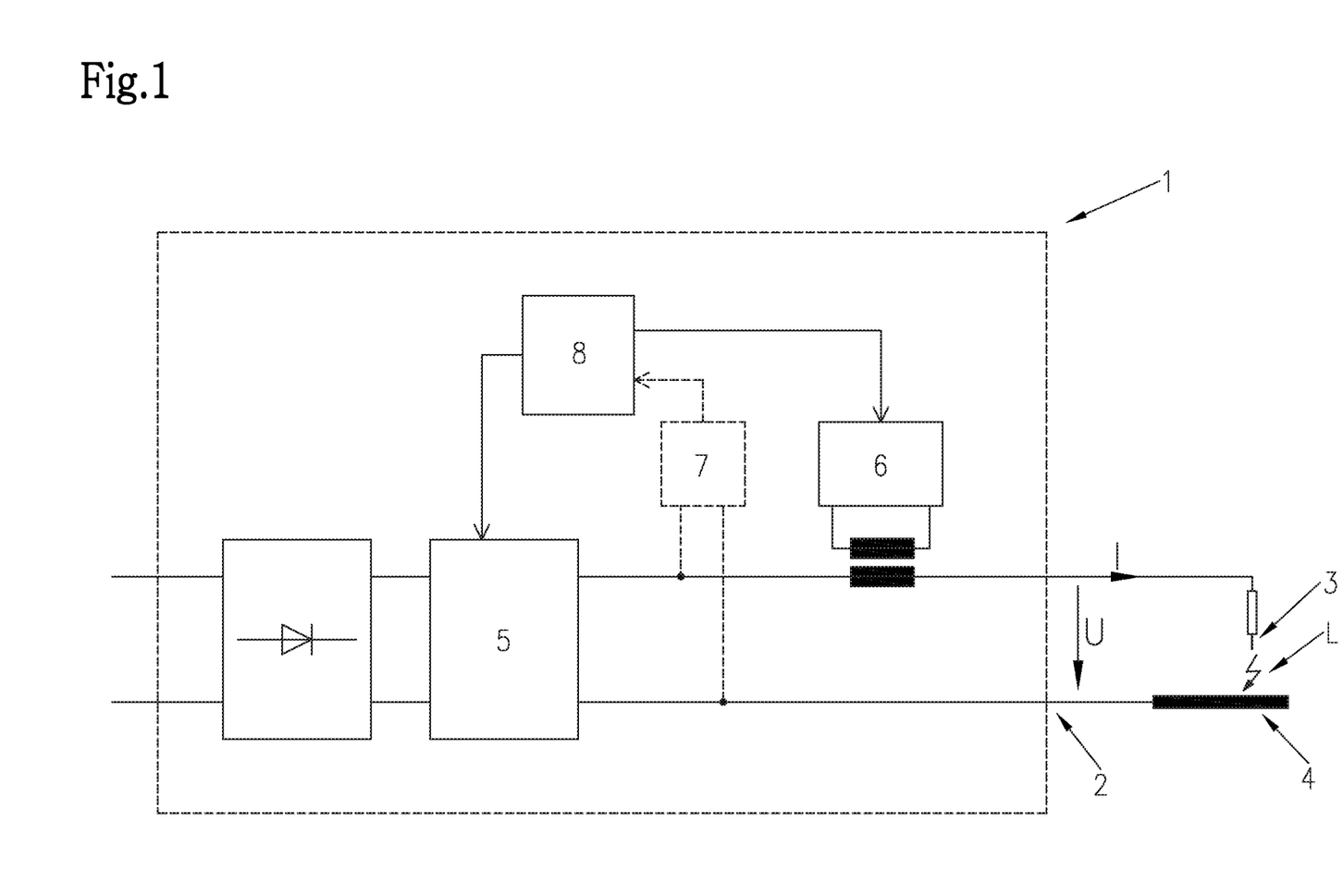
FIG. 1 is a block circuit diagram of a welding current source of the present invention.

FIG. 1 shows a block circuit diagram of a welding current source 1 in accordance with the present invention. The welding current source 1 is used to provide a welding current I and a welding voltage U at an output 2, for carrying out a welding process with an arc L between an electrode 3 and a workpiece 4 to be welded. The electrode 3 can be a non-melting electrode, in particular a tungsten electrode, but also a melting electrode. The welding current source 1 includes a resonance converter 5 for generating the welding voltage U. The resonance converter 5 may be formed, in particular, by a series-parallel resonance converter. Such circuits are particularly simple in design and are used in a range of welding current sources 1. The resonance converter 5 is connected via appropriate upstream circuits, such as rectifiers or the like, to the supply network.

For contactless ignition of the arc L between the electrode 3 and workpiece 4, a circuit 6 for generating high-frequency pulses $U_{I,HF}$ is provided, which high frequency pulses $U_{I,HF}$ are superimposed on the open circuit welding voltage $U_{LL}$ at the output 2 of the welding current source 1, specifically in a time-synchronous manner, in the region of at least some of the periodically recurring voltage maxima $U_{LL,max}$ of the open circuit welding voltage $U_{LL}$. Under the assumption of fixed timing parameters, the times of the periodically recurring voltage maxima $U_{LL,max}$ can be determined with sufficient accuracy and the superposition of the high-frequency pulses $U_{I,HF}$ is carried out with sufficient accuracy. The circuit 6 for generating high-frequency pulses $U_{I,HF}$ can also be arranged in parallel with the output 2 or arc L (not shown).

In order to improve the temporal synchronicity of the superposition a control device 8 can be provided, which controls the circuit 6 for generating high-frequency pulses accordingly. Optionally, a measuring device 7 for detecting the welding voltage U can be provided, which measuring device 7 is connected to the control device 8, so that the high-frequency pulses $U_{I,HF}$ can be superimposed on the output 2 time-synchronously with detected defined voltage values $U_{LL,def}$.

Because the high-frequency pulses $U_{I,HF}$ are superimposed in the region of the voltage maxima $U_{LL,max}$ of the open circuit voltage $U_{LL}$, the igniting voltage can be increased and thus a reliable igniting of the arc L can be guaranteed. The additional circuit complexity is minimal, and therefore the welding current source 1 does not need to be designed substantially larger and more expensive compared to conventional welding current sources. The high-frequency pulses $U_{I,HF}$ can be superimposed on the maximum of the open circuit voltage $U_{LL,max}$ shortly before or shortly after it occurs. The high-frequency pulses $U_{I,HF}$ do not need to be superimposed on each voltage maximum $U_{LL,max}$, but only on some of the voltage maxima $U_{LL,max}$, for example, only every second or every third voltage maximum $U_{LL,max}$.

Figure 2:
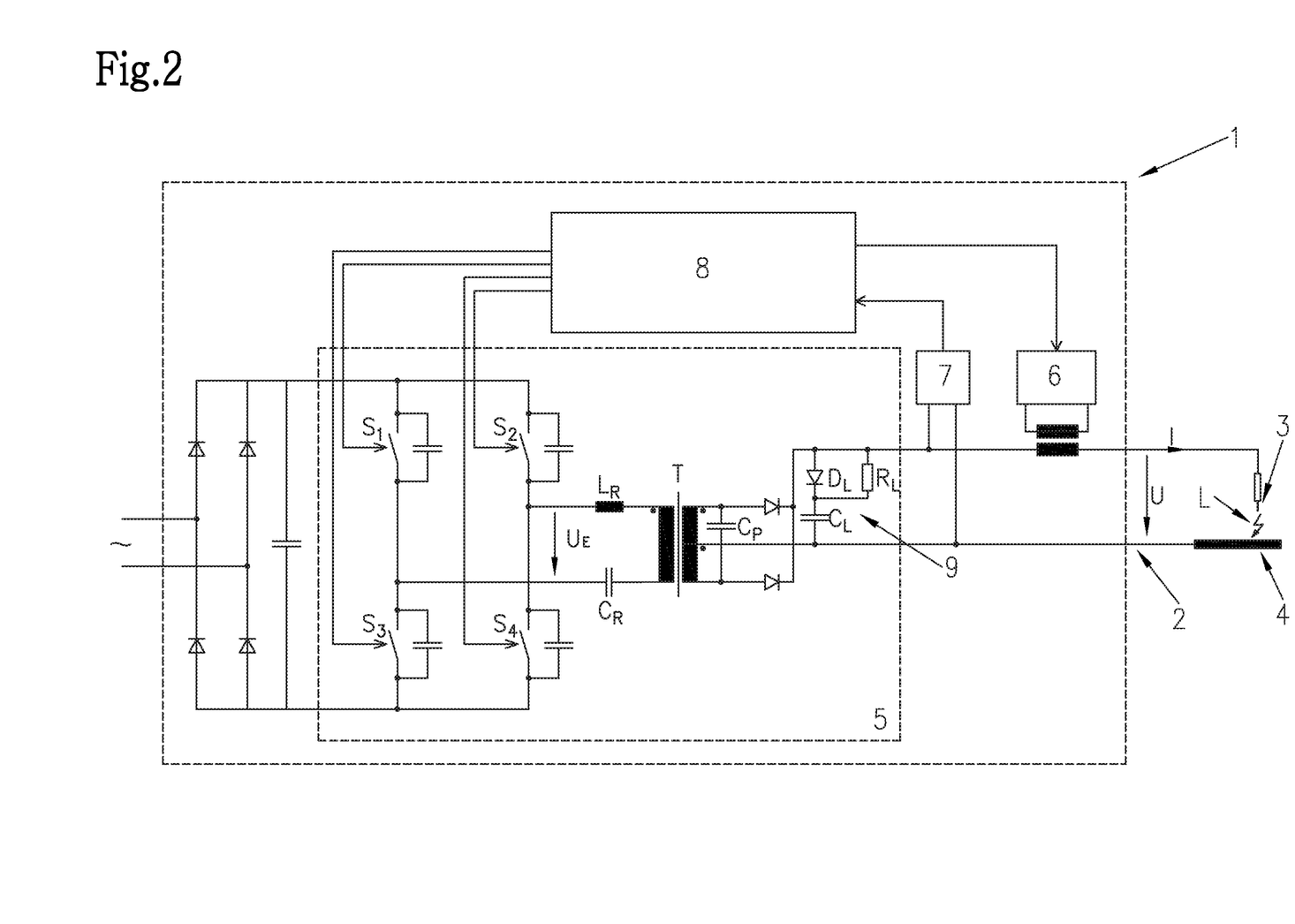
FIG. 2 is a block circuit diagram of a further design variant of a welding current source according to the present invention.

FIG. 2 shows an extended block circuit diagram compared to FIG. 1 of a welding current source 1, in which the resonance converter 5 for generating the periodically varying open circuit welding voltage $U_{LL}$ is formed by a series-parallel resonant converter with an inductor $L_R$, a capacitor $C_R$ and a capacitor $C_p$. In addition, the resonance converter 5 has a transformer T. The switches S1, S2, S3 and S4 generate voltage pulses at the input $U_E$ of the resonant circuit, which excite the resonant circuit $L_R$, $C_R$ and $C_p$. The capacitors shown parallel to the switches S1 to S4 are their parasitic capacitances and have no influence on the resonant circuit, because they are many times smaller than the capacitance $C_R$. The series-parallel resonance converter illustrated also has the property that in the open circuit condition (i.e. without a connected load) the welding voltage U is increased as a result of the resonant circuit formed with $C_p$, in such a way that a control of the resonance converter 5 is also required in the open circuit condition. To this end, the resonance converter 5 is operated in pulsed mode in the open circuit condition. At the input $U_E$ of the resonance converter 5, voltage pulses are applied for a specific period of time. An additional circuit 9 to maintain the open circuit welding voltage $U_{LL}$, consisting of the diode $D_L$, the resistor $R_L$ and the capacitor $C_L$, represents one implementation option for operating the series-parallel resonance converter in pulsed mode in the open circuit condition. The oscillation generated by the resonance converter 5 charges the smoothing capacitor $C_L$ via the diode $D_L$ on the secondary side. In the time in which no voltage pulses are applied, the smoothing capacitor $C_L$ discharges via resistor $R_L$. At the output of the resonance converter 5 therefore, a periodically varying, preferably substantially sawtooth-shaped open circuit welding voltage $U_{LL}$ with voltage maxima $U_{LL,max}$ periodically recurring at a frequency $f_w$ is produced (see FIG. 3).

Figure 3:
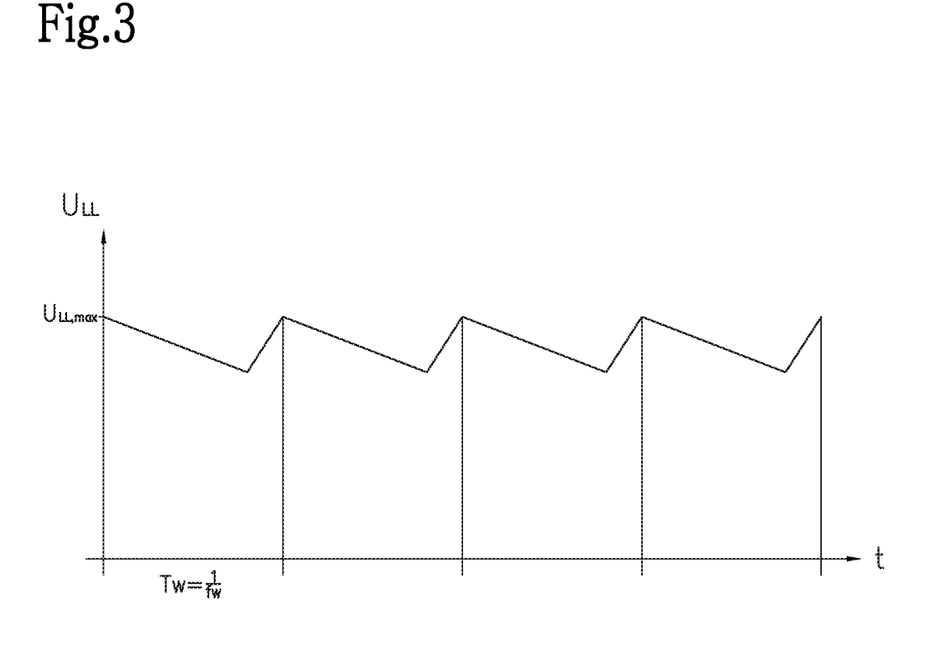
FIG. 3 shows the temporal waveform of the open circuit welding voltage of a welding current source with a resonance converter.

FIG. 3 shows the temporal waveform of the open circuit welding voltage $U_{LL}$ of a welding current source 1 with a resonance converter. Accordingly, at the output 2 of the welding current source 1 an open circuit welding voltage $U_{LL}$ results, which has a periodically varying, substantially sawtooth-shaped open circuit welding voltage $U_{LL}$ with recurring voltage maxima $U_{LL,max}$ at a repetition rate $f_w$.

Figure 4:
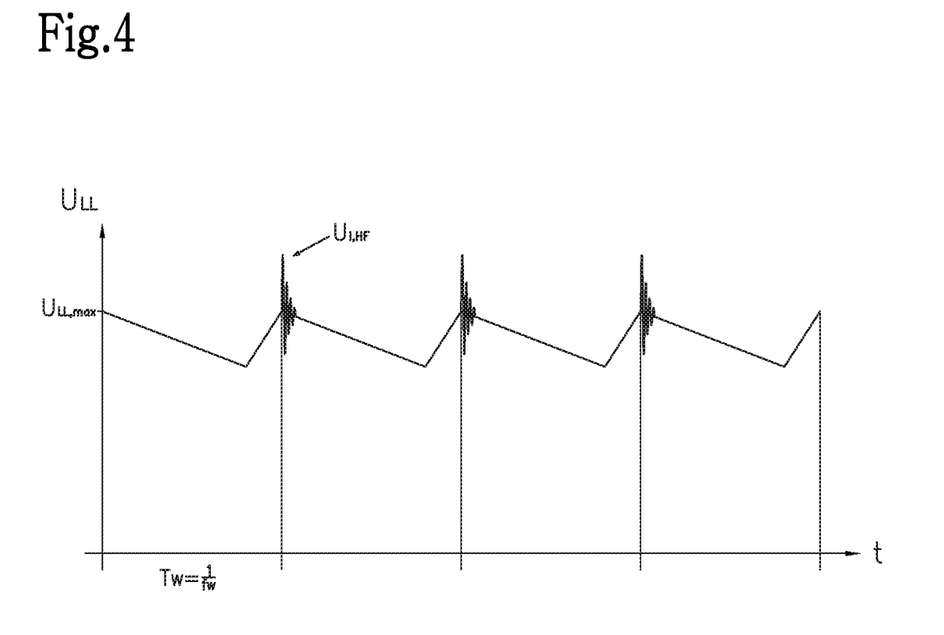
FIG. 4 shows the temporal waveform of the open circuit welding voltage on the application of the igniting process according to the invention.

FIG. 4 shows the temporal waveform of the open circuit welding voltage $U_{LL}$ on the application of the igniting process according to the invention. In the diagram, on some (here on each) of the occurring voltage maxima $U_{LL,max}$, in the region of the voltage maximum $U_{LL,max}$ a high-frequency pulse $U_{I,HF}$ is superimposed. This facilitates the igniting of the arc L without the maximum average voltage at the output 2 of the welding current source 1 exceeding prescribed limits. It is important that the energy content of the high-frequency pulses $U_{I,HF}$ over time does not exceed regulatory limits.

Figure 5:
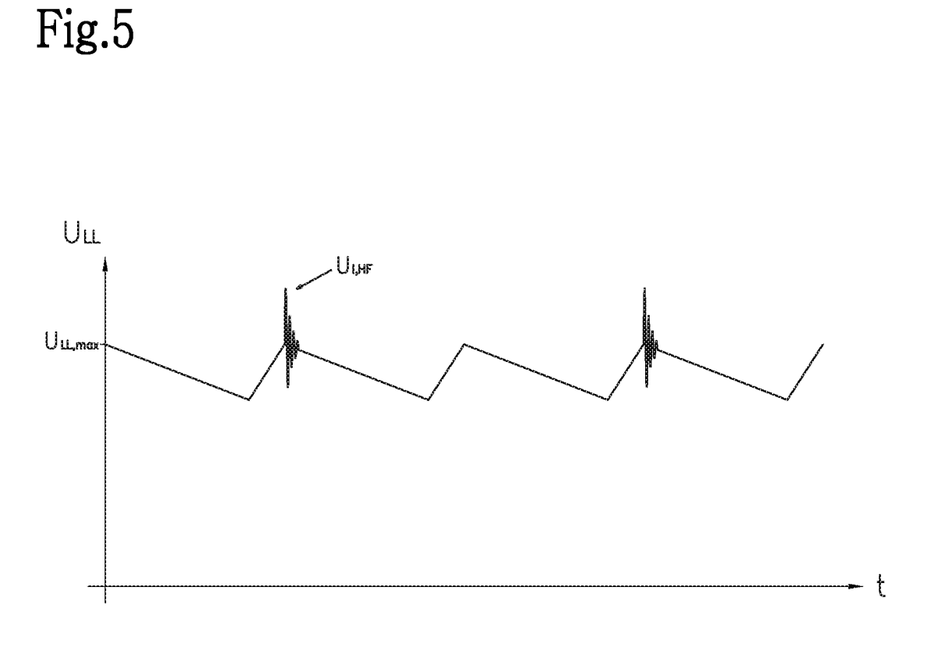
FIG. 5 shows the temporal waveform of the open circuit welding voltage in a variant of the igniting process according to the invention.

FIG. 5 shows the temporal waveform of the open circuit welding voltage $U_{LL}$ at the output 2 of the welding current source 1 in a variant of the igniting process relative to FIG. 3. In this case, the high-frequency pulses $U_{I,HF}$ are superimposed on only every second maximum of the open circuit voltage $U_{LL,max}$. Accordingly, there is more time available for recharging storage components of the circuit 6 for generating the high-frequency pulses $U_{I,HF}$, and over time a lower amount of energy is transmitted via the output 2.

Figure 6:
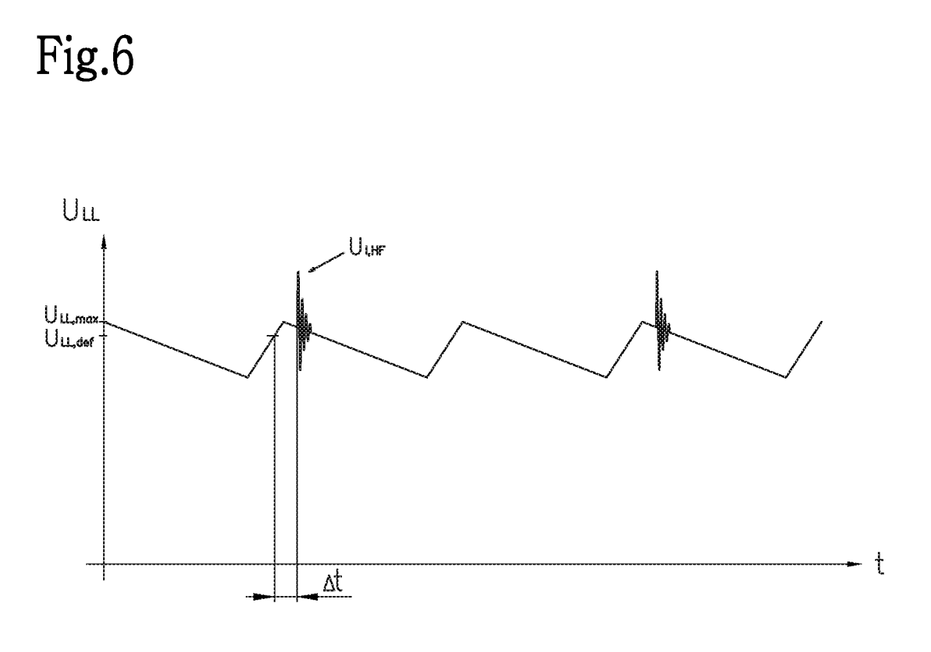
FIG. 6 shows the temporal waveform of the open circuit welding voltage in another variant of the igniting process.

FIG. 6 shows an extract of the temporal waveform of the open circuit voltage $U_{LL}$ at the output 2 of a welding current source 1, wherein the open circuit welding voltage $U_{LL}$ is continuously measured and compared with a defined voltage value $U_{LL,def}$. The defined voltage $U_{LL,def}$ is slightly below the expected or adjusted maximum open circuit welding voltage $U_{LL,max}$, so that the detection in the region of the voltage maximum $U_{LL,max}$ can be reliably guaranteed. After the detection of the defined voltage value $U_{LL,def}$ at least in some cases a high-frequency pulse $U_{I,HF}$ is superimposed, which facilitates or enables the contactless ignition of the arc L. The temporal delay between the occurrence of the defined voltage value $U_{LL,def}$ and the time of the superposition of the high-frequency pulse $U_{I,HF}$ is offset by a predefined time period Δt, wherein the length of the period Δt can be, for example, between 0 and 5 ms.

The invention claimed is:

1. A method for contactless ignition of an arc between an electrode and a workpiece which is to be welded, for carrying out a welding process, the method comprising:
    providing a welding current and a welding voltage at an output of a welding current source;
    generating using a resonant converter in the welding current source a periodically varying, substantially sawtooth-shaped, open circuit welding voltage with voltage maxima which recur periodically with a repetition rate, wherein the resonant converter comprises a series-parallel resonant converter; and
    superimposing temporally synchronous high-frequency pulses on the open circuit welding voltage in a region of at least some of the periodically recurring voltage maxima of the open circuit welding voltage.

2. The method according to claim 1, wherein temporally synchronous high-frequency pulses are superimposed on the open circuit welding voltage in a region of every nth voltage maximum of the open circuit welding voltage, where n is a positive whole number greater than or equal to 1.

3. The method according to claim 1, wherein the welding voltage is measured and the exceeding of a defined voltage value is detected, and the high-frequency pulses are superimposed time-synchronously on at least some detected defined voltage values.

4. The method according to claim 1, wherein the high-frequency pulses are superimposed by a specified period of time before or after the occurrence of the voltage maximum.

5. The method according to claim 1, wherein an open circuit welding voltage is made available with a repetition rate between 10 Hz and 100 Hz.

6. The method according to claim 1, wherein high-frequency pulses are superimposed with a frequency between 100 kHz and 10 MHz.

7. A welding current source for providing a welding current and a welding voltage at an output for carrying out a welding process with an arc between an electrode and a workpiece to be welded, comprising:
   a resonant converter for generating a periodically varying, substantially saw-tooth-shaped, open circuit welding voltage with voltage maxima, which recur periodically with a repetition rate, wherein the resonant converter comprises a series-parallel resonant converter; and
   a circuit for generating high-frequency pulses, wherein the circuit, in order to ignite the arc contactlessly, is designed to time-synchronously superpose the high-frequency pulses onto the open circuit welding voltage in a region of at least some periodically recurring voltage maxima of the open circuit welding voltage.

8. The welding current source according to claim 7, wherein the circuit for generating the high-frequency pulses is designed to superimpose the high-frequency pulses of the open circuit welding voltage time-synchronously in a region of every nth voltage maximum of the open circuit welding voltage, where n is a positive whole number greater than or equal to 1.

9. The welding current source according to claim 7, wherein further comprising
   a measuring device comprising a voltage detector for detecting the welding voltage; and
   a control device comprising a controller or control circuit; said measuring device being connected via the control device to the circuit for generating the high-frequency pulses so that the high-frequency pulses can be time-synchronously superimposed with detected defined voltage values.

10. The welding current source according to claim 7, wherein the circuit for generating the high-frequency pulses is designed to superimpose the high-frequency pulses temporally offset by a specified period of time before or after the occurrence of the voltage maximum.

11. The welding current source according to claim 7, wherein the resonant converter is designed for generating the periodically varying open circuit voltage with a repetition rate of between 10 Hz and 100 Hz, in particular 33 Hz.

12. The welding current source according to claim 7, wherein the circuit is designed for generating high-frequency pulses between 100 kHz and 10 MHz.

13. The welding current source according to claim 7, wherein the electrode comprises a non-melting electrode.

14. The method according to claim 1, wherein the high-frequency pulses are superimposed by up to 5 ms before or after the occurrence of the voltage maximum.

15. The welding current source according to claim 7, wherein the circuit for generating the high-frequency pulses is designed to superimpose the high-frequency pulses temporally offset by up to 5 ms before or after the occurrence of the voltage maximum.

16. The method according to claim 5, wherein the repetition rate is 33 Hz.

17. The welding current source according to claim 7, wherein the repetition rate is 33 Hz.

18. The welding current source according to claim 7, wherein the electrode comprises a tungsten electrode.

* * * * *

UNITED STATES PATENT AND TRADEMARK OFFICE
CERTIFICATE OF CORRECTION

PATENT NO. : 11,633,800 B2
APPLICATION NO. : 16/651514
DATED : April 25, 2023
INVENTOR(S) : Musil et al.

It is certified that error appears in the above-identified patent and that said Letters Patent is hereby corrected as shown below:

In the Claims

In Claim 9, Line 2 (Column 7, Line 27), please delete "wherein"

In Claim 11, Line 4 (Column 8, Line 12), please delete ", in particular 33 Hz"

Signed and Sealed this
Thirtieth Day of May, 2023

Katherine Kelly Vidal
*Director of the United States Patent and Trademark Office*